(12) United States Patent
Park et al.

(10) Patent No.: US 11,226,147 B2
(45) Date of Patent: Jan. 18, 2022

(54) REFRIGERATOR HAVING A TRANSFER MEMBER TO TRANSFER ICE STORED IN AN ICE BUCKET AND FIRST AND SECOND COUPLERS

(71) Applicant: Samsung Electronics Co., Ltd., Suwon-si (KR)

(72) Inventors: Kyoung Ki Park, Suwon-si (KR); Jin Jeong, Yongin-si (KR); Bong Su Son, Cheonan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 161 days.

(21) Appl. No.: 16/145,946

(22) Filed: Sep. 28, 2018

(65) Prior Publication Data

US 2019/0101317 A1   Apr. 4, 2019

(30) Foreign Application Priority Data

Sep. 29, 2017 (KR) .................. 10-2017-0128091

(51) Int. Cl.
*F25C 5/20* (2018.01)
*F25D 23/04* (2006.01)

(52) U.S. Cl.
CPC .................. *F25C 5/22* (2018.01); *F25C 5/24* (2018.01); *F25D 23/04* (2013.01); *F25C 2400/10* (2013.01); *F25C 2500/02* (2013.01)

(58) Field of Classification Search
CPC ........ F25D 23/025; F25D 23/02; F25D 23/06; F25D 23/04; F25C 5/20; F25C 5/22;
(Continued)

(56) References Cited

U.S. PATENT DOCUMENTS

| 3,930,380 A | 1/1976 | Fogt |
| 3,937,032 A | 2/1976 | Bright |

(Continued)

FOREIGN PATENT DOCUMENTS

| CN | 1590940 A | 3/2005 |
| CN | 102235433 A | 11/2011 |

(Continued)

OTHER PUBLICATIONS

International Search Report and Written Opinion of the International Searching Authority dated Jan. 28, 2019 in International Patent Application No. PCT/KR2018/011436.

(Continued)

*Primary Examiner* — Steve S Tanenbaum
(74) *Attorney, Agent, or Firm* — Staas & Halsey, LLP

(57) ABSTRACT

The refrigerator includes an ice maker; an ice bucket; a transfer member configured to transfer ice stored in the ice bucket; a drive motor unit configured to generate a driving force for driving the transfer member; a first coupler connected to the transfer member; and a second coupler separably coupled to the first coupler and coupled to the drive motor unit. The first coupler includes an insertion portion insertable into the second coupler, and a first inclined portion to guide the insertion portion to be inserted into the second coupler. The second coupler includes a seating portion to receive the first coupler, and a second inclined portion to guide the first coupler to the seating portion.

19 Claims, 14 Drawing Sheets

(58) Field of Classification Search
CPC .... F25C 2500/02; F25C 2700/08; F25C 5/18; F25C 5/182; F25C 5/24; F25C 2400/10; F16D 2001/103; F16D 3/10
USPC ................................ 403/298, 359.1; 62/344
See application file for complete search history.

(56) References Cited

U.S. PATENT DOCUMENTS

| | | | | |
|---|---|---|---|---|
| 8,974,140 | B2* | 3/2015 | Durling | .................. F16D 1/033 403/357 |
| 10,228,179 | B2* | 3/2019 | Fischer | .................. F25C 5/185 |
| 2005/0044874 | A1 | 3/2005 | Lee et al. | |
| 2008/0134710 | A1 | 6/2008 | An et al. | |
| 2009/0145157 | A1 | 6/2009 | Jeong et al. | |
| 2009/0241582 | A1 | 10/2009 | Kim | |
| 2012/0096872 | A1* | 4/2012 | Cheong | ................ F25D 23/025 62/3.3 |
| 2013/0327076 | A1* | 12/2013 | Jeong | ........................ F25C 5/22 62/321 |
| 2014/0206462 | A1 | 7/2014 | Paliwal et al. | |
| 2019/0208925 | A1* | 7/2019 | Kim | ........................ F25D 23/02 |

FOREIGN PATENT DOCUMENTS

| | | | |
|---|---|---|---|
| CN | 102455108 A | 5/2012 | |
| DE | 102011018853 | 1/2012 | |
| KR | 20-1998-0057037 | 10/1998 | |
| KR | 20-0324064 | 8/2003 | |
| KR | 10-2005-0021066 | 3/2005 | |
| KR | 10-2008-0013639 | 2/2008 | |
| KR | 10-2010-0024129 | 3/2010 | |
| KR | 10-2011-0040482 | 4/2011 | |
| KR | 10-1565410 | 11/2015 | |
| KR | 10-1632213 | 6/2016 | |
| KR | 10-2016-0116309 | 10/2016 | |
| WO | WO-2017213466 A1 * | 12/2017 | ............. F25D 23/02 |

OTHER PUBLICATIONS

Extended European Search Report dated Aug. 10, 2020 in European Patent Application No. 18862958.8.
Chinese Office Action dated May 26, 2021, in Application No. 201880063653.0 (seventeen pages including translation).
European Office Action dated May 3, 2021, in Application No. 18 862 958.8-1009 (six pages).

* cited by examiner

REFRIGERATOR HAVING A TRANSFER MEMBER TO TRANSFER ICE STORED IN AN ICE BUCKET AND FIRST AND SECOND COUPLERS

CROSS-REFERENCE TO RELATED APPLICATIONS

This application is based on and claims priority under 35 U.S.C. § 119 to Korean Patent Application No. 10-2017-0128091, filed on Sep. 29, 2017, in the Korean Intellectual Property Office, the disclosure of which is incorporated by reference herein in its entirety.

BACKGROUND

1. Field

The following description relates to a power transmission structure between a transfer member and a transfer motor in an ice bucket of a refrigerator.

2. Description of the Related Art

A refrigerator is an apparatus configured to keep foods fresh by including a main body having a storage compartment and a cooling apparatus configured to supply cool air to the storage compartment. The storage compartment includes a refrigerating compartment for refrigerating the food by being kept from approximately 0° C. to approximately 5° C. and a freezing compartment for freezing the food by being kept from approximately −30° C. to approximately 0° C.

The refrigerator is also provided with an ice maker for generating ice for convenience of use. Particularly, in the refrigerator, an automatic ice maker that automatically generates ice, stores the generated ice, and discharges the stored ice to the dispenser may be provided.

The automatic ice maker includes an ice-making tray for generating ice, an ice bucket for storing ice generated in the ice-making tray, a transfer member provided inside the ice bucket for transferring the ice in the ice bucket, and a transfer motor for driving the transfer member. The transfer member receives the driving force from the transfer motor through a coupling device. However, when a first coupler on the ice bucket side and a second coupler on the motor side are pushed together, the first and the second coupler may not be coupled to each other due to an interference between the first and the second coupler based on a rotational position of the first and the second coupler.

SUMMARY

Therefore, it is an aspect of the present disclosure to provide a refrigerator having a coupling device, when an ice bucket is mounted to a motor, capable of allowing first and second coupler to be smoothly connected to each other, regardless of a position of the first coupler and the second coupler.

It is an aspect of the present disclosure to provide a refrigerator capable of allowing a user to easily couple an ice bucket to a motor and to easily remove the ice bucket from the refrigerator without opening a storage compartment.

Additional aspects of the present disclosure will be set forth in part in the description which follows and, in part, will be obvious from the description, or may be learned by practice of the present disclosure.

In accordance with an aspect of the disclosure, a refrigerator includes an ice maker configured to generate ice; an ice bucket configured to store ice; a transfer member configured to transfer ice stored in the ice bucket; a drive motor unit configured to generate a driving force for driving the transfer member; a first coupler connected to the transfer member; and a second coupler separably coupled to the first coupler and coupled to the drive motor unit. The first coupler includes an insertion portion engaged with the second coupler by being inserted into the second coupler, and a first inclined portion inclined to guide the insertion portion to be inserted into the second coupler, and the second coupler includes a seating portion engaged with the first coupler by allowing the insertion portion to be seated thereon, and a second inclined portion inclined to guide the first coupler to the seating portion.

The first inclined portion may extend from an outer circumferential surface of the insertion portion to a direction into which the first coupler is inserted, and the first inclined portion may be inclined inwardly with respect to a radial direction of the outer circumferential surface of the insertion portion, and the second inclined portion may extend in a direction opposite to a direction, into which the first coupler is inserted, from an inner circumferential surface of the seating portion, and the second inclined portion may be inclined outwardly with respect to a radial direction of the inner circumferential surface of the seating portion.

The first coupler may further include a first engaging portion extending from the outer circumferential surface of the insertion portion to the outer circumferential surface of the first inclined portion, and the second coupler may further include a second engaging portion extending from the inner circumferential surface of the seating portion to the inner circumferential surface of the second inclined portion.

When the first coupler is inserted into the second coupler in a direction which is not parallel with a central axis of an inner circumferential surface of the second coupler, the second inclined portion may guide the first inclined portion to be seated on the seating portion such that a central axis of the outer circumferential surface of the first coupler is parallel with the central axis of the inner circumferential surface of the second coupler.

The first engaging portion may include a first peak portion protruding in a radial direction from a central axis of an outer circumferential surface of the first coupler and a first valley portion being recessed on the first peak portion in a direction of a central axis of an outer circumferential surface of the first coupler, and the second engaging portion may include a second peak portion protruding in a direction of a central axis of an inner circumferential surface of the second coupler and a second valley portion being recessed on the second peak portion in a radial direction of a central axis of an inner circumferential surface of the second coupler.

When the first coupler is inserted into the second coupler such that the first peak portion and the second peak portion are overlapped in the direction of the central axis of the inner circumferential surface of the first coupler, the first coupler may be inserted into the second insertion portion after being rotated to allow the first peak portion to be overlapped with the second valley portion.

When the first engaging portion is engaged with the second engaging portion, the second engaging portion may be rotated by the drive motor unit and the first engaging portion may be rotated by interlocking with the rotation of the second engaging portion.

The first coupler may be obliquely inclined with respect to a vertical direction of the ice bucket, and the second coupler extends in parallel with the first coupler.

The first coupler may extend from one end of the transfer member and be integrally formed with the transfer member.

The refrigerator may further include a guide member, when the ice bucket is mounted to a lower side of the ice maker, configured to guide the ice bucket to allow the first coupler to be inserted into the second coupler in a parallel manner.

The ice bucket may include a guide protrusion in contact with the guide member and guided by the guide member when the ice bucket is mounted.

The guide member may include a guide surface extending in parallel with a direction in which the second coupler extends, and the guide protrusion may be moved in parallel with the direction in which the second coupler extends, along the guide surface.

The refrigerator may further include a storage compartment; an inner door configured to open and close the storage compartment; and an ice making compartment disposed on a front surface of the inner door to be separated from the storage compartment by the inner door, and in which the ice maker and the ice bucket are provided.

The ice bucket may be provided separably to the outside of the refrigerator in a state in which the inner door is closed.

The refrigerator may further include an outer door provided in front of the inner door to be rotatable in the same direction as the inner door to open and close the ice maker.

The ice bucket may be provided separably to the outside of the refrigerator in a state in which the outer door is opened.

In accordance with an aspect of the disclosure, a refrigerator includes a main body provided with a storage compartment; an inner door rotatably coupled to the main body to open and close the storage compartment; an ice maker separated from the storage compartment by the inner door and disposed on a front surface of the inner door; an ice bucket provided in a lower side of the ice maker and configured to be separable to the outside in a state in which the inner door is closed; a transfer member configured to transfer ice stored in the ice bucket; a drive motor unit configured to generate a driving force for driving the transfer member; a first coupler connected to the transfer member; and a second coupler separably engaged with the first coupler and coupled to the drive motor unit. The first coupler is inserted into the second coupler in a direction inclined with respect to a vertical direction of the ice bucket.

The refrigerator may further include a storage compartment; an inner door configured to open and close the storage compartment; an ice making compartment disposed on a front surface of the inner door to be separated from the storage compartment by the inner door, and in which the ice maker and the ice bucket are provided; and an outer door provided in front of the inner door to be rotatable in the same direction as the inner door to open and close the ice maker, The ice bucket is provided separably to the outside of the refrigerator in a state in which the outer door is opened.

The refrigerator may further include a first coupler connected to the transfer member; and a second coupler separably coupled to the first coupler and coupled to the drive motor unit. The first coupler may include an insertion portion engaged with the second coupler by being inserted into the second coupler, and a first inclined portion extended from the insertion portion in an insertion direction and inclined inwardly with respect to an outer circumferential surface of the insertion portion, to guide the insertion portion to be inserted into the second coupler, and the second coupler may include a seating portion engaged with the first coupler by allowing the insertion portion to be seated thereon, and a second inclined portion extended in a direction opposite to a direction, into which the first coupler is inserted, and inclined outwardly with respect to an outer circumferential surface of the seating portion to guide the first coupler to the seating portion.

The refrigerator may further include a guide member, when the ice bucket is mounted to a lower side of the ice maker, configured to guide the ice bucket to allow the first coupler to be inserted into the second coupler in a parallel manner. The guide member may include a guide surface extending in parallel with a direction in which the second coupler extends, and the ice bucket is moved along the guide surface.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
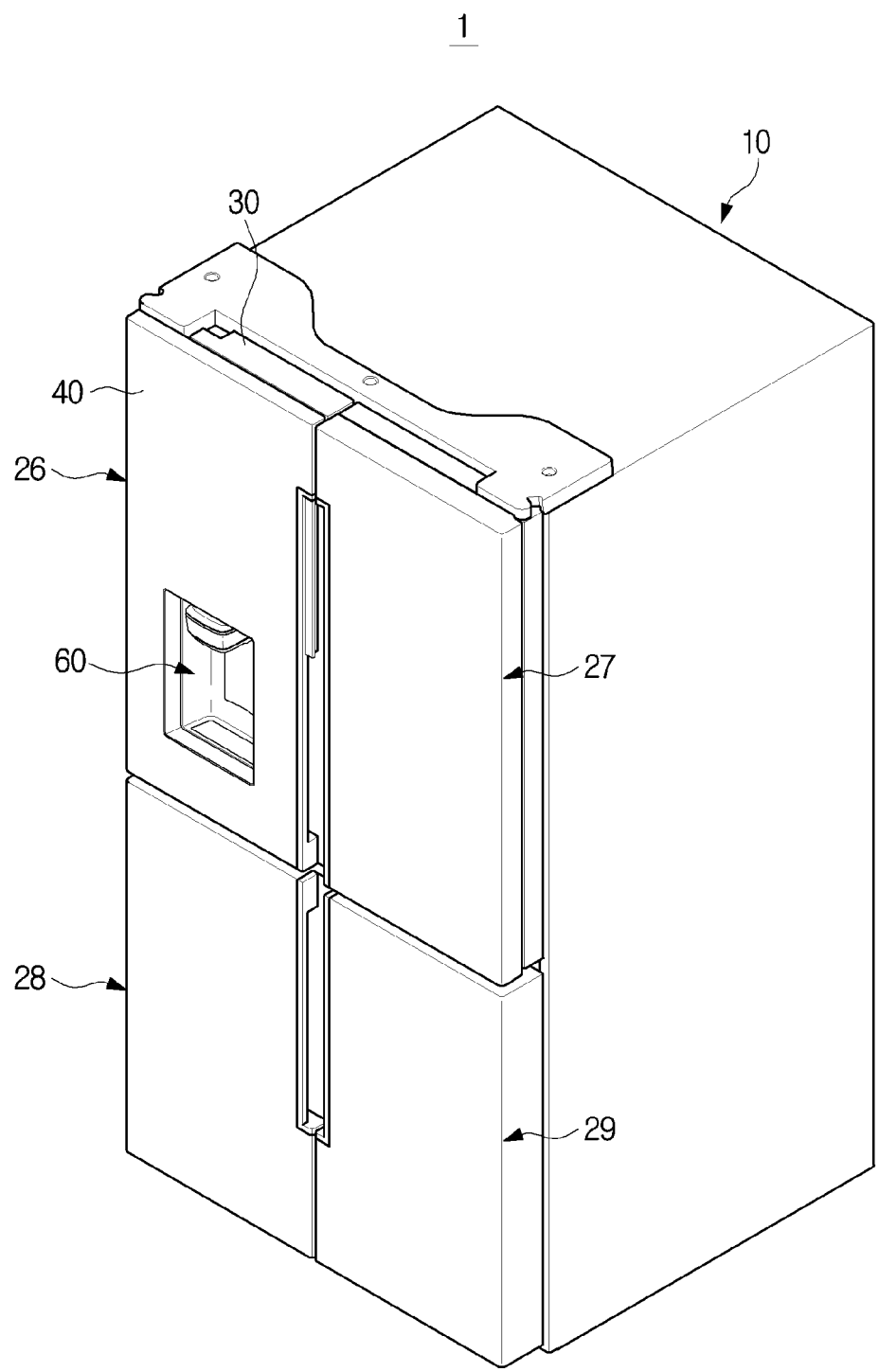
FIG. 1 is a perspective view illustrating a refrigerator according to an embodiment.

Embodiments described in the present disclosure and configurations shown in the drawings are merely examples of the embodiments of the present disclosure, and may be modified in various different ways at the time of filing of the present application to replace the embodiments and drawings of the present disclosure The present disclosure will be described more fully hereinafter with reference to the accompanying drawings.

Figure 2:
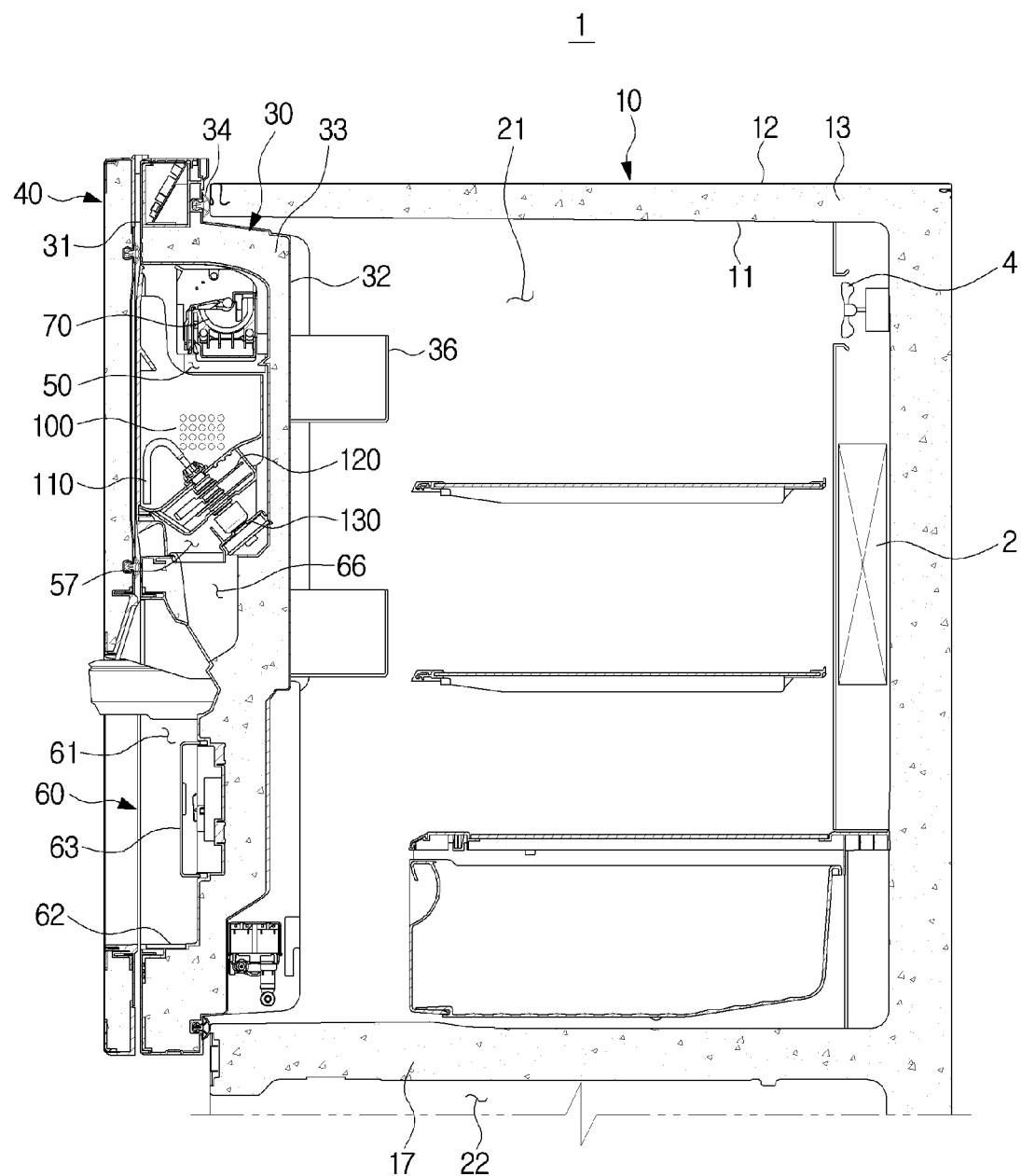
FIG. 2 is a cross-sectional view schematically illustrating a main configuration of the refrigerator of FIG. 1.
Figure 3:
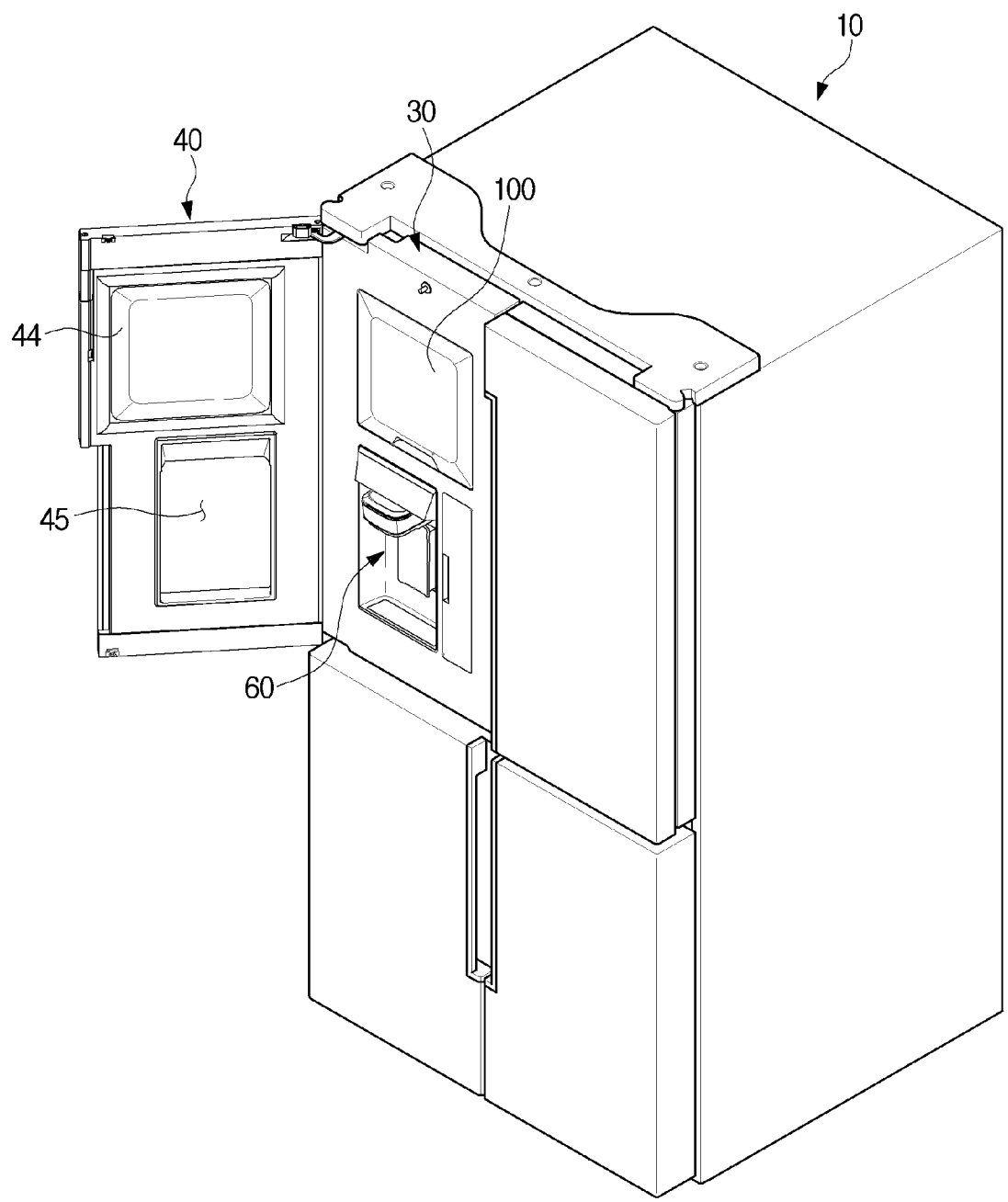
FIG. 3 is a view illustrating a state in which an outer door of the refrigerator of FIG. 1 is opened.
Figure 4:
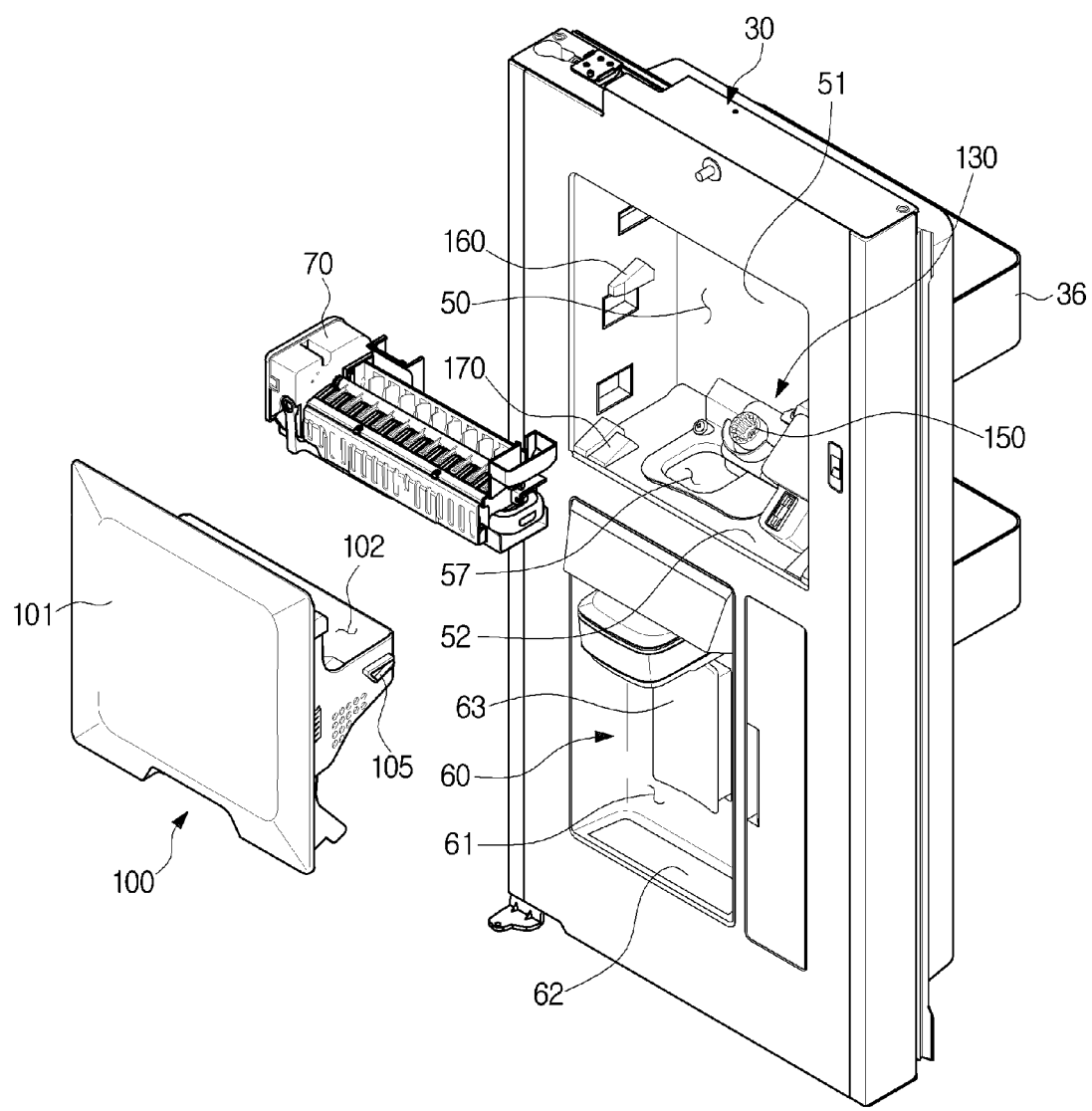
FIG. 4 is an enlarged view illustrating some components of the door of the refrigerator of FIG. 1.
Figure 5:
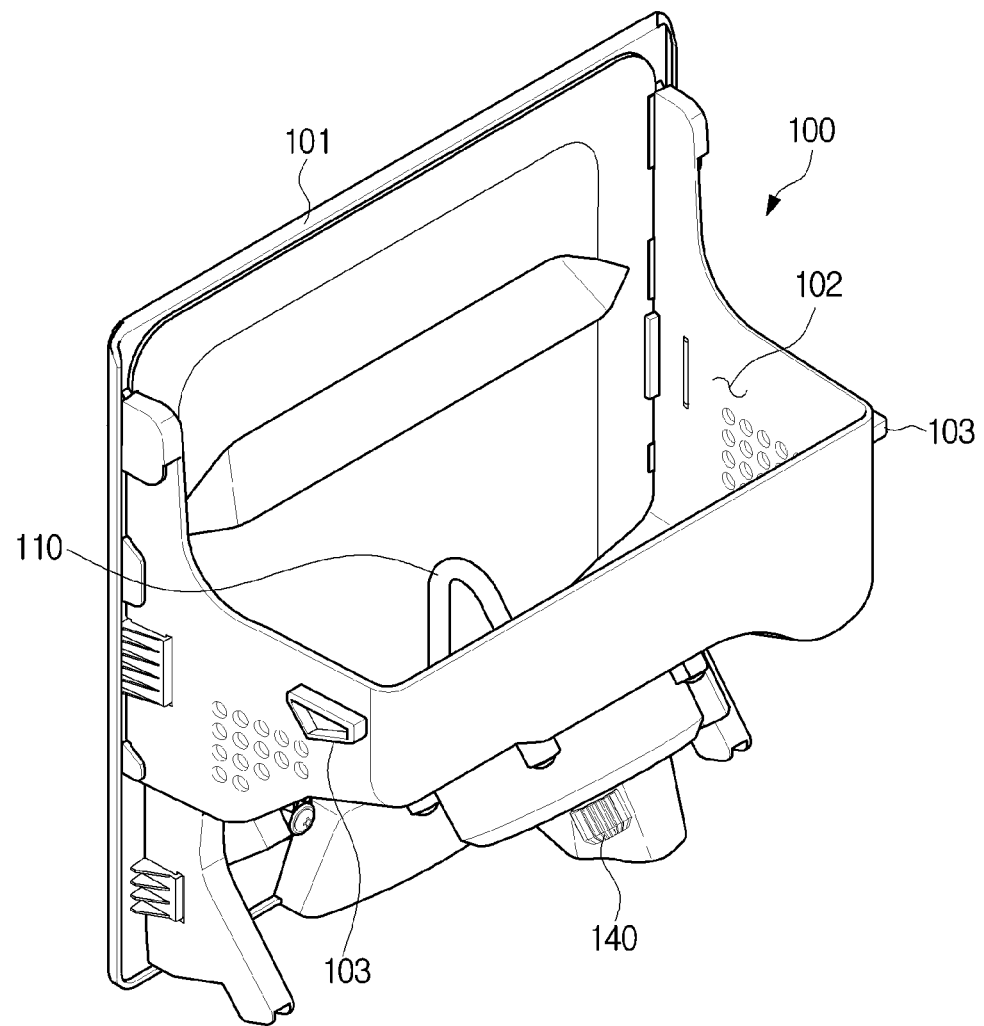
FIG. 5 is a rear perspective view illustrating a rear side of an ice bucket of the refrigerator of FIG. 1.

FIG. 1 is a perspective view illustrating a refrigerator according to an embodiment, FIG. 2 is a cross-sectional view schematically illustrating a main configuration of the refrigerator of FIG. 1, FIG. 3 is a view illustrating a state in which an outer door of the refrigerator of FIG. 1 is opened, FIG. 4 is an enlarged view illustrating some components of the door of the refrigerator of FIG. 1, and FIG. 5 is a rear perspective view illustrating a rear side of an ice bucket of the refrigerator of FIG. 1.

Referring to FIGS. 1 to 5, a refrigerator 1 may include a main body 10 provided with a storage compartment 21 and a storage compartment 22, a plurality of doors 26, 27, 28, and 29 provided in front of the storage compartments 21 and 22, an ice making compartment 50 provided in the door 26 to produce ice and store the ice, and a cooling apparatus configured to supply cool air to the storage compartments 21 and 22.

The cooling apparatus may generate cool air using latent heat of refrigerant by having an evaporator 2, a compressor (not shown), a condenser (not shown) and an expansion device (not shown). The cool air generated in the evaporator 2 may be supplied to the storage compartments 21 and 22 and the ice making compartment 50 by the operation of a blowing fan 4. Although not shown in FIG. 2, an additional evaporator may be disposed in the storage compartment 22 provided in the lower side to supply cool air to the lower storage compartment 22.

In addition, the refrigerator 1 may include a cold air duct (not shown) configured to connect the evaporator (not shown) to the ice making compartment 50 to supply the cold air, which is generated in the evaporator (not shown) disposed in the lower side, to the ice making compartment 50.

The main body 10 may include an inner case 11 forming the storage compartments 21 and 22, an outer case 12 forming an outer appearance of the refrigerator 1 by being coupled to the outside of the outer case 12, and an insulating material 13 provided between the inner and outer cases 11 and 12 to insulate the storage compartments 21 and 22. The inner case 11 may be formed by injection molding of a plastic material, and the outer case 12 may be formed of a metallic material. Urethane foam insulation may be used as the insulating material 13, and if necessary, a vacuum insulation panel may be used together with the urethane foam insulation.

The main body 10 may include an intermediate wall 17, and the storage compartments 21 and 22 may be partitioned into an upper storage compartment 21 and a lower storage compartment 22 by the intermediate wall 17. The intermediate wall 17 may include an insulating material, and the upper storage compartment 21 and the lower storage compartment 22 may be insulated from each other by the intermediate wall 17.

The upper storage compartment 21 may be used as a refrigerating compartment for refrigerating the food by being kept from approximately 0° C. to approximately 5° C., and the lower storage compartment 22 may be used as a freezing compartment for freezing the food by being kept at from approximately −30° C. to approximately 0° C.

The storage compartments 21 and 22 may be provided such that a front thereof may be opened to allow food to be put and taken, and the open front of the storage compartments 21 and 22 may be opened or closed by the doors 26, 27, 28, and 29 rotatably mounted to the storage compartments 21 and 22. The storage compartment 21 may be opened or closed by the door 26 and 27, and the storage compartment 22 may be opened or closed by the door 28 and 29.

The door 26 may include an inner door 30 rotatably coupled to the main body 10 to open and close the storage compartment 21 and an outer door 40 rotatably provided in front of the inner door 30. The inner door 30 may be rotatably coupled to the main body 10 by a hinge member 70. The outer door 40 may be rotatably coupled to the inner door 30 by a hinge member (not shown) or may be rotatably coupled to the main body 10. The inner door 30 and the outer door 40 may be configured to be rotatable in the same direction.

The outer door 40 may have a size corresponding to a size of the inner door 30. Accordingly, when both the inner door 30 and the outer door 40 are closed, only a dispenser 60 of the inner door 30 may be exposed through an opening 45 (to be described later) of the outer door 40, and another part of the inner door 30 may be covered by the outer door 40 and not exposed to the outside.

The ice making compartment 50 may be provided in a portion of door 26. Particularly, the ice making compartment 50 may be formed on the front surface of the inner door 30 to be partitioned, separated, and independent from the storage compartment 21 by the inner door 30. The inner door 30 may include a front plate 31, a rear plate 32 coupled to the rear of the front plate 31, and an insulating material 33 provided between the front plate 31 and the rear plate 32. The ice making compartment 50 may be formed such that a part of the front plate 31 is recessed toward the insulating material 33. The ice making compartment 50 may be formed such that its front surface is open. The open front face of the ice making compartment 50 may be opened and closed by the outer door 40.

In the same manner as the insulating material 13 of the main body 10, urethane foam insulation may be used as the insulating material 33 and a vacuum insulation panel may be used together with urethane foam insulation, if necessary. The ice making compartment 50 may be insulated from the storage compartment 21 of the main body 10 by the insulating material 33.

The ice making compartment 50 may be provided with an ice making system capable of manufacturing, storing, and transferring ice. The ice making system may include an ice maker 70 manufacturing ice by cooling water after storing water, an ice bucket 100 storing the ice manufactured by the ice maker 70, a transfer member 110 transferring the ice stored in the ice bucket 100 to the dispenser 60, and an ice grinding blade 120 grinding the ice.

The transfer member 110 may be rotated to agitate or transfer ice by receiving power from a drive motor unit 130 configured to generate a rotational force. The transfer member 110 and the drive motor unit 130 may be coupled by a first coupler 140 connected to the transfer member 110 and a second coupler 150 connected to the drive motor unit 130. The first coupler 140 and the second coupler 150 are coupled to each other and thus the rotational force generated in the drive motor unit 130 may be transmitted to the transfer member 110. This will be described in detail later.

The ice maker 70 may include an ice making cell storing water, and an ejector removing the ice produced in the ice making cell from the ice making cell into the ice bucket 100.

The ice making system may include a full ice sensing device configured to sense whether the ice bucket 100 is full of ice, and the ice making system may be configured to automatically perform a series of operation such as supplying water, freezing water, removing ice, sensing whether the bucket is full, stirring ice, and grinding ice.

The transfer member 110 and the ice grinding blade 120 may be integrally provided in the ice bucket 100. A discharge port 57 may be formed in the lower portion of the ice bucket 100 to discharge the stored ice to a chute 66.

The inner door 30 may include the dispenser 60 configured to provide water and ice to the user. The dispenser 60 may include a dispensing space 61 recessed to receive water and ice, a dispensing tray 62 configured to allow a container such as a cup to be placed in the dispensing space 61, and a switch 63 configured to receive an operation command of the dispenser.

The inner door 30 may include the chute 66 connecting the ice making compartment 50 to the dispensing space 61 to guide the ice of the ice bucket 100 to the dispensing space 61. The outer door 40 may have the opening 45 to allow a user to access to the dispenser 60 of the inner door 30 without opening the outer door 40. The opening 45 may be formed at a position corresponding to the dispenser 60. The opening 45 may have a substantially rectangular shape.

A door bin 36 storing food may be provided on the rear surface of the inner door 30. A gasket 34 may be provided on the rear surface of the inner door 30 to seal the storage compartment 21 and a gasket 44 may be provided on the rear surface of the outer door 40 such that the gasket 44 is in close contact with the front surface of the inner door 30 to seal the ice making compartment 50.

Accordingly, as illustrated in FIGS. 3 and 4, a user can open the outer door 40 to access the ice making compartment 50 to take out the ice bucket 100 without opening the inner door 30. Therefore, it may be easy to take out ice from the ice bucket 100 or it may be easy to repair, clean, and replace the ice bucket 100 and the drive motor unit 130, the transfer member 110, and the ice grinding blade 120, wherein the drive motor unit 130, the transfer member 110, and the ice grinding blade 120 are coupled to the ice bucket 100.

Further, because the inner door 30 is kept closed upon using the ice making compartment 50, it may be possible to prevent cold air from leaking from the storage compartment 21 and therefore save energy.

The ice bucket 100 may include an outer surface 101 facing the front of the refrigerator 1 to prevent the ice making compartment 50 from being exposed to an outside of the refrigerator when the outer door 40 is opened. The size of the outer surface 101 may correspond to the size of the opening of the ice making compartment 50 disposed in the inner door 30. The ice bucket 100 may store ice in a storage space 102 provided on the rear side of the outer surface 101.

The outer surface 101 may prevent the ice maker 70 disposed inside the ice making compartment 50 from being exposed to the outside of the refrigerator. The user can separate the ice maker 70 after separating the ice bucket 100 after opening the outer door 40.

The drive motor unit 130 coupled to the ice bucket 100 may be disposed below the ice making compartment 50. The drive motor unit 130 may include a motor (not shown) for generating a rotational force and a gear or a plurality of gears (not shown) connected to the motor, and the drive motor unit 130 may transmit the rotational force to the second coupler 150 disposed on a side of the drive motor unit 130.

The second coupler 150 may be disposed on the drive motor unit 130 and be inclined at an upward angle.

The first coupler 140 detachably coupled to the second coupler 150 may be disposed on the rear side of the ice bucket 100. The first coupler 140 may be inclined at a downward angle from the rear side of the ice bucket 100 and thus the ice bucket 100 may be coupled to the second coupler 150 when the ice bucket 100 is mounted to the ice making compartment 50.

The first coupler 140 and the second coupler 150 may be disposed in the ice bucket 100 and the drive motor unit 130, respectively, such that the first coupler 140 and the second coupler 150 have a rotation axis and are rotated with respect to the rotation axis. When the first coupler 140 and the second coupler 150 are coupled to each other, the second coupler 150 may be rotated by the drive motor unit 130 and the first coupler 140 may be rotated together with the second coupler 150. Accordingly, the first coupler 140 may transmit the rotational force to the transfer member 110. The coupling between the first coupler 140 and the second coupler 150 will be described in detail below.

The ice bucket 100 may be coupled to the drive motor unit 130 through the couplers 140 and 150 when the ice bucket 100 is separated and then mounted to the ice making compartment 50 again. This is because the ice bucket 100 is required to be coupled to the drive motor unit 130 through the couplers 140 and 150 to transmit the rotational force to the transfer member 110 disposed inside of the ice bucket 100.

That is, the ice bucket 100 is mounted to the ice making compartment 50 in such a manner that the first coupler 140 connected to the transfer member 110 is coupled to the second coupler 150 coupled to the drive motor unit 130, and thus the first coupler 140 is interlocked with the second coupler 150 to rotate the transfer member due to the rotation of the second coupler 150.

As for a conventional coupler, the first coupler and the second coupler are provided with a pressing rib, respectively, wherein each pressing rib, which is configured to press the coupler in a rotation direction, protrudes from the body, which is rotated with respect to a rotation axis of each coupler, in a direction opposite to each other. Each pressing rib provided in each coupler may be provided in parallel with a circumferential direction with respect to the rotation axis, and thus when the pressing rib provided in the second coupler is rotated in one direction by the drive motor, the pressing rib provided in the second coupler may press the corresponding pressing rib provided in the first coupler in the circumferential direction of the rotation axis to allow the rotational force generated in the drive motor to be transmitted to the first coupler.

However, when the ice bucket is mounted to the ice making compartment, the respective couplers may not be coupled due to the degree of rotation of the respective couplers.

As described above, when the pressing rib of the first coupler and the pressing rib of the second coupler are arranged in parallel with each other in the circumferential direction of the rotation axis of the coupler, the pressing rib of the first coupler and the pressing rib of the second coupler may be coupled to each other to drive. However, when the pressing rib of the first coupler and the pressing rib of the second coupler are overlapped in the rotation axis direction, the couplers may be not coupled to each other due to interference that occurs between the couplers.

Accordingly, before mounting the ice bucket, a user is required to manually rotate the first coupler or the second coupler to a predetermined angle to allow the pressing rib of the first coupler and the pressing rib of the second coupler to be disposed in parallel with each other in the circumferential direction of the rotation axis to couple the couplers with each other.

In addition, when a user tries to couple the first coupler to the second coupler in a state in which the rotation axis of the first coupler is not parallel with the rotation axis of the second coupler, the coupling between the couplers may be not completed. Therefore, the user should adjust an angle of the couplers to allow the couplers to be in parallel with each other and then mount the ice bucket. That is, when the body of the first coupler approaches the body of the second coupler in a state in which the body of the first coupler is not parallel with the body of the second coupler, the coupler may be not coupled to each other and thus it may be required for the user to adjust a coupling angle to allow the couplers to be in parallel with each other.

As mentioned above, according to the conventional method, when mounting the ice bucket, there may be an inconvenience for a user due to the problem in the coupling between the first coupler and the second coupler. To prevent the inconvenience, as for the refrigerator 1 according to an embodiment, when a user mounts the ice bucket 100 to the ice making compartment 50, particularly, when the user manually adjusts the couplers 140 and 150 or when the coupler are coupled to each other, the user may easily mount the ice bucket 100 although an angle of the first coupler 140 is not identical to an angle of the second coupler 150.

Hereinafter, the first coupler 140 and the second coupler 150 will be described in detail.

Figure 6:
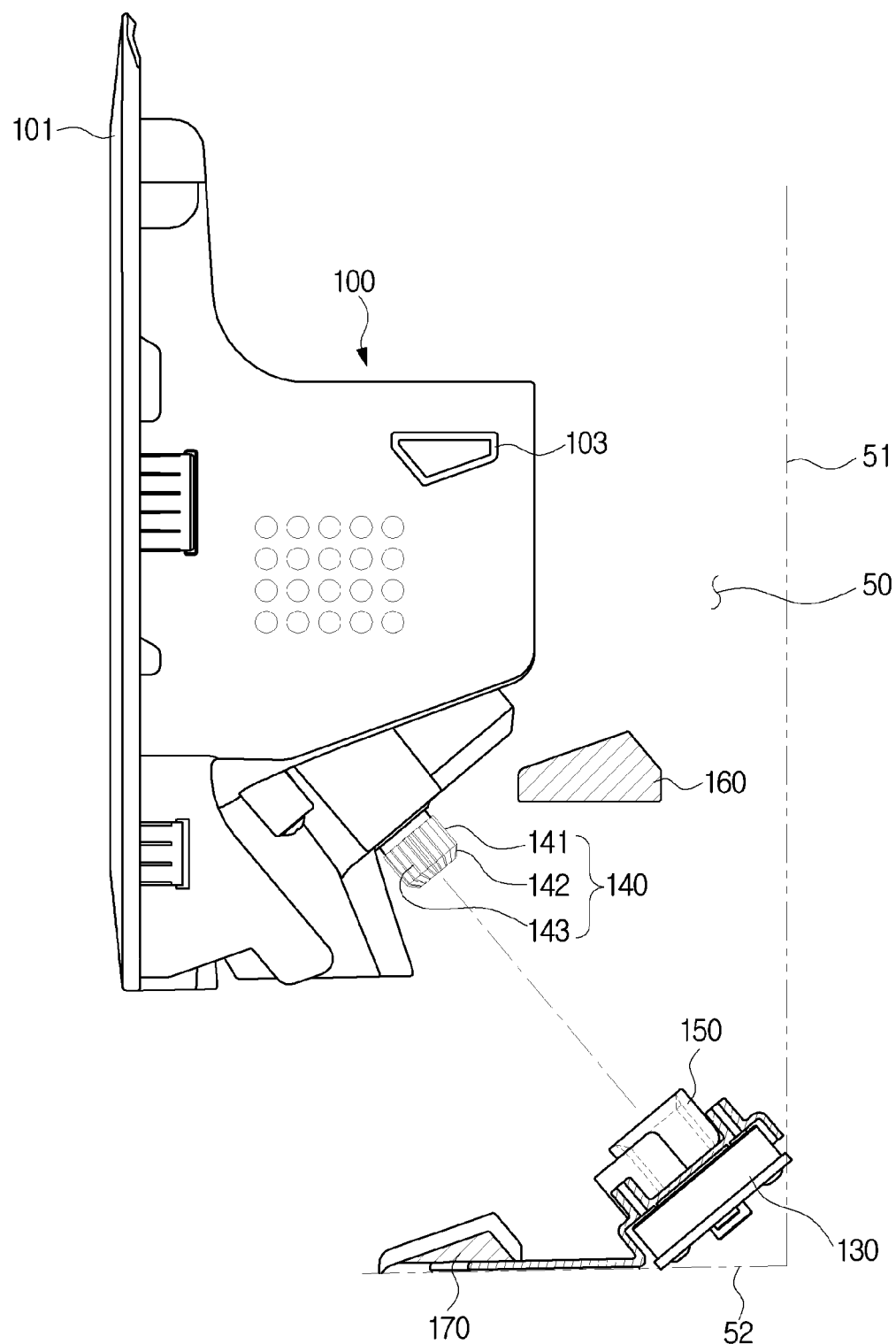
FIG. 6 is a view illustrating a state in which the ice bucket of the refrigerator of FIG. 1 is coupled with a drive motor unit.
Figure 7A:
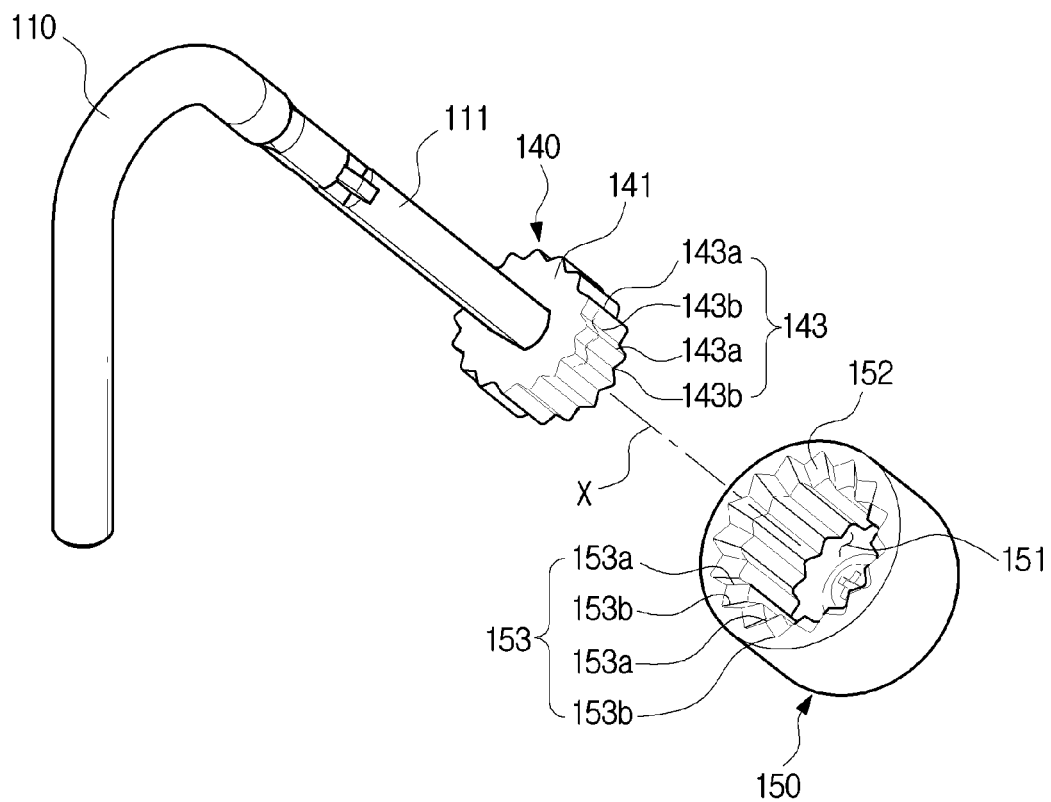
FIG. 7A is a view illustrating a state before a first coupler is coupled to a second coupler in the refrigerator of FIG. 1.
Figure 7B:
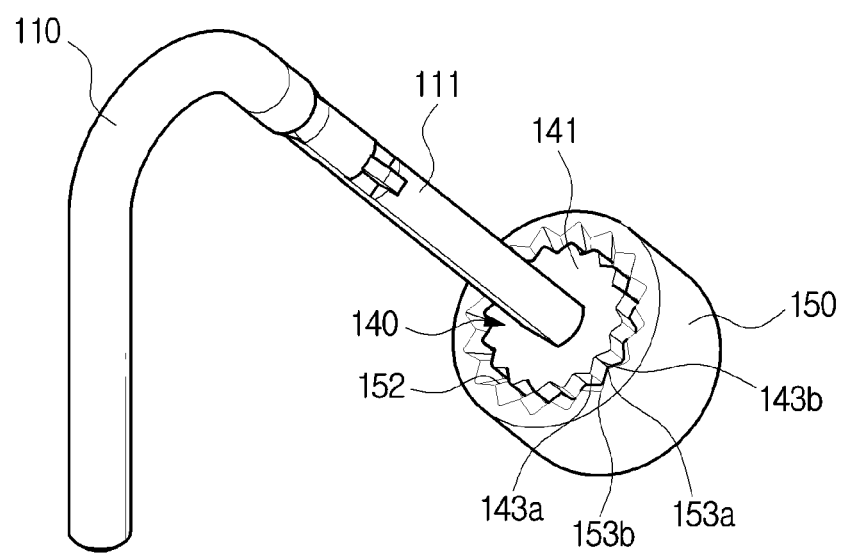
FIG. 7B is a view illustrating a state in which the first coupler is coupled to the second coupler of FIG. 7A.
Figure 8:
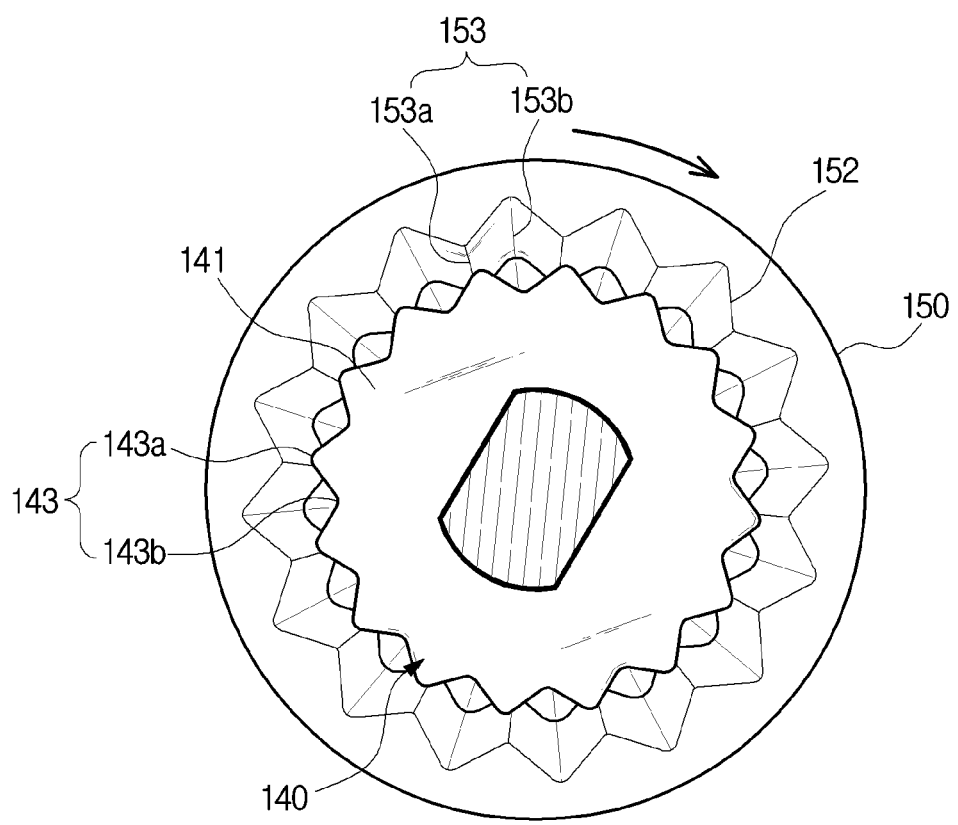
FIG. 8 is a view illustrating a state in which the first coupler is rotated when first and second engaging portions interfere with each other upon coupling the first coupler and the second coupler of FIG. 1.
Figure 9A:
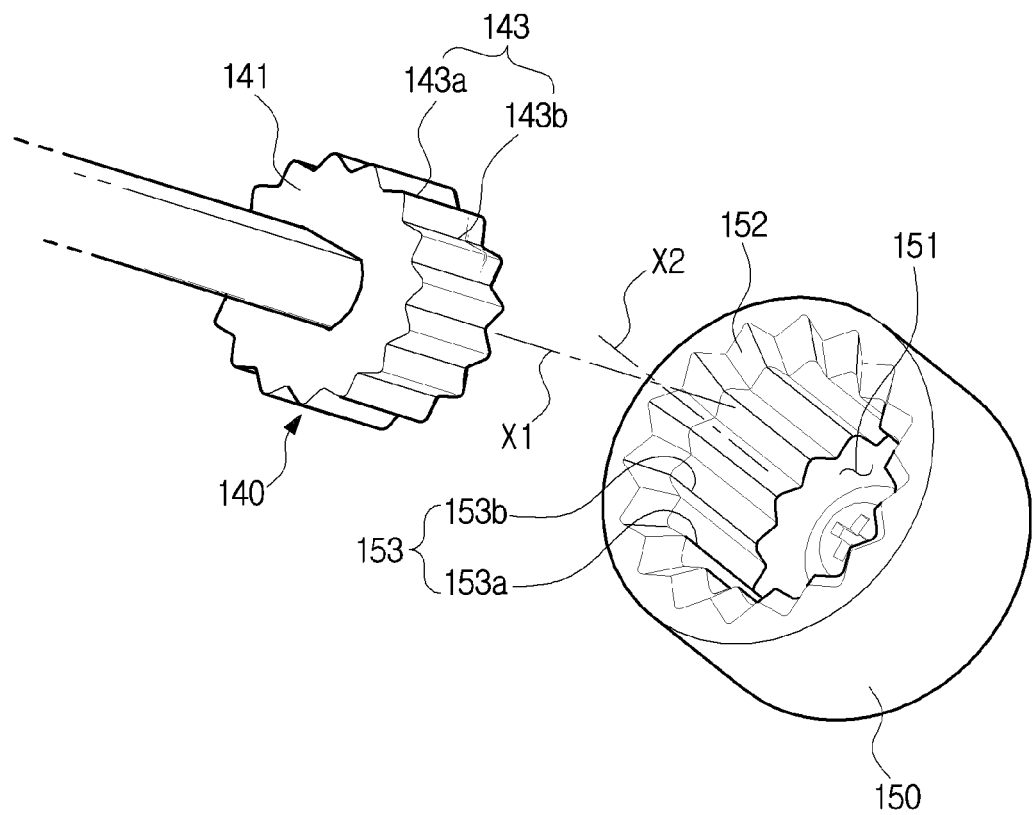
FIG. 9A is a view illustrating a state in which the first and second couplers of FIG. 1 are coupled when a rotation axis of the first coupler and a rotation axis of the second coupler are not parallel with each other.
Figure 9B:
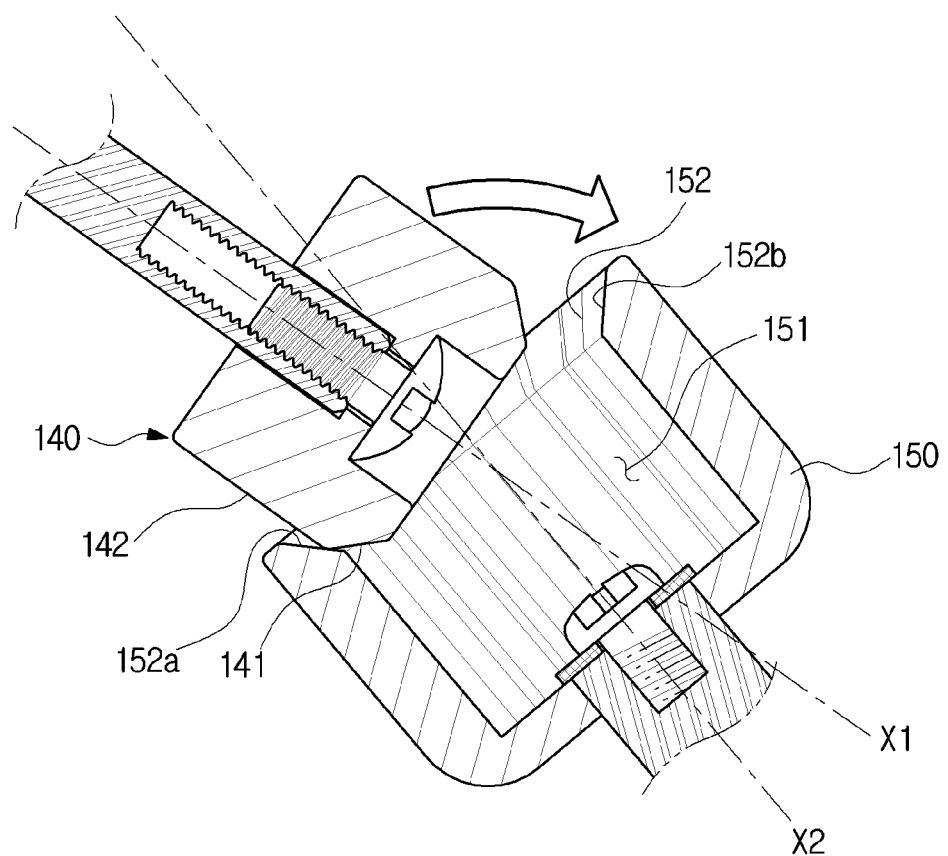
FIG. 9B is a cross-sectional view illustrating a state in which the first and second couplers of FIG. 1 are coupled when the rotation axis of the first coupler and the rotation axis of the second coupler are not parallel with each other.
Figure 9C:
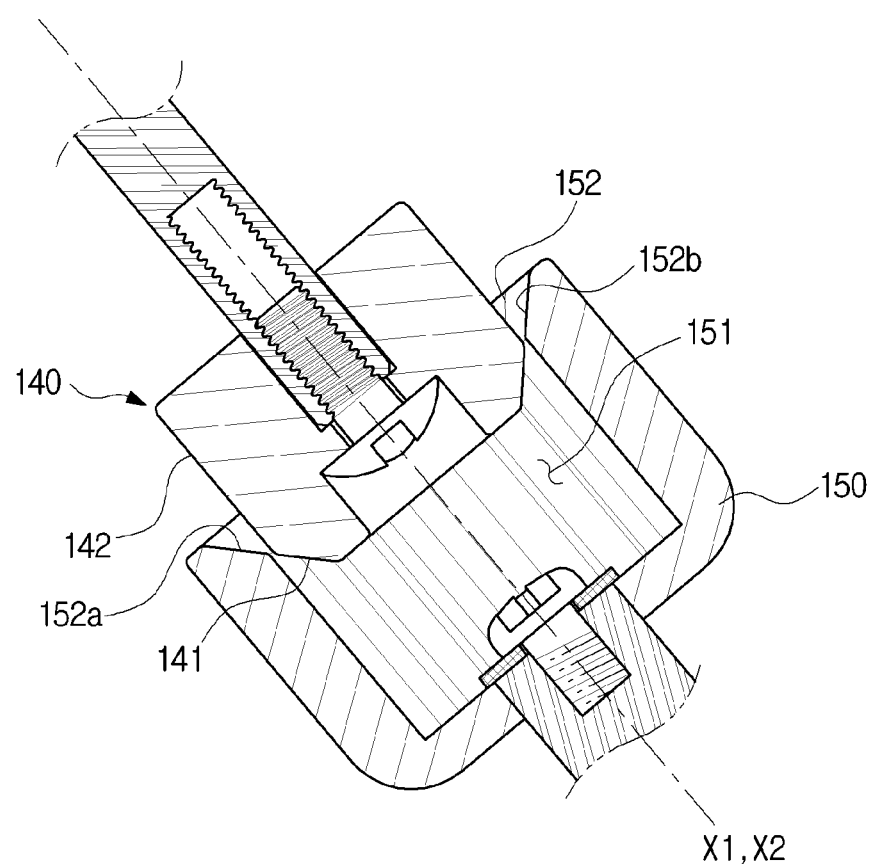
FIG. 9C is a cross-sectional view illustrating a state in which the first coupler of FIG. 9B is moved and inserted into the second coupler.

FIG. 6 is a view illustrating a state in which the ice bucket of the refrigerator of FIG. 1 is coupled with a drive motor unit, FIG. 7A is a view illustrating a state before a transfer device is coupled to first and second couplers in the refrigerator of FIG. 1, FIG. 7B is a view illustrating a state in which the first coupled is coupled to the second coupler of FIG. 7A, FIG. 8 is a view illustrating a state in which the first coupler is rotated when first and second engaging portions are not engaged upon coupling between the first coupler and the second coupler of FIG. 1, FIG. 9A is a view illustrating a state in which the first and second couplers of FIG. 1 are coupled when a rotation axis of the first coupler and a rotation axis of the second coupler are not parallel with each, FIG. 9B is a cross-sectional view illustrating a state in which the first and second couplers of FIG. 1 are coupled when the rotation axis of the first coupler and the rotation axis of the second coupler are not parallel with each and FIG. 9C is a cross-sectional view illustrating a state in which the first coupler of FIG. 9B is moved and inserted into the second coupler.

As illustrated in FIG. 6, the ice bucket 100 may be mounted to the inside of the ice making compartment 50. Particularly, the ice bucket 100 may be mounted to the inside of the ice making compartment 50 by being coupled to the drive motor unit 130 in an oblique direction with respect to an inner wall 51 (refer to FIG. 4) of the ice making compartment 50.

More particularly, the ice bucket 100 may be coupled to the drive motor unit 130 in such a manner that the first coupler 140 provided in the ice bucket 100 is coupled to the second coupler 150 provided in the drive motor unit 130.

The drive motor unit 130 may be disposed on a lower wall 52 of the ice making compartment 50 while being inclined in an upward direction with respect to the lower wall 52. The second coupler 150 may extend in a direction in which the drive motor unit 130 is inclined in the upward direction. The first coupler 140 may extend toward the drive motor unit 130 from the rear side of the ice bucket 100 in a direction parallel to the direction in which the second coupler 150 extends obliquely.

The first coupler 140 may be coupled to the second coupler 150 while being inserted into the second coupler 150. Accordingly, the ice bucket 100 may be coupled to the drive motor unit 130 in a direction parallel to a direction in which the first coupler 140 and the second coupler 150 extend. That is, the ice bucket 100 may be mounted to the inside of the ice making compartment 50 in the oblique direction with respect to the inner wall 51 of the ice making compartment 50.

According to an embodiment, because the coupler members 140 and 150 are coupled to each other in a simple coupling manner in which the first coupler 140 is inserted into the second coupler 150 as described above, the user may easily mount the ice bucket 100 to the ice making compartment 50 while coupling the couplers 140 and 150.

The first coupler 140 may include an insertion portion 141 inserted into the second coupler 150 and engaged to the second coupler 150, and a first inclined portion 142 extended from the insertion portion 141 to a direction, in which the first coupler 140 is inserted into the second coupler 150, and inclined from an outer circumferential surface of the insertion portion 141 to the direction of the rotation axis of the first coupler 140. The first inclined portion 142 may guide the insertion portion 141 so that the insertion portion 141 is inserted into the inside of the second coupler 150.

The insertion portion 141 may be provided in a cylindrical shape, and the first inclined portion 142 may be obliquely tapered from one end of the insertion portion 141 to a direction of the central axis of the cylindrical shape of the insertion portion 141.

The first coupler 140 may include a first engaging portion 143 extending from the outer circumferential surface of the insertion portion 141 to the outer circumferential surface of the first inclined portion 142. The first engaging portion 143 may be a portion engaged with the second coupler 150, and include a plurality of peaks 143a protruding radially outward with respect the rotation axis of the first coupler 140, and a plurality of valleys 143b (refer to FIG. 7A). Particularly, the first engaging portion 143 may extend to the first inclined portion 142 as well as the insertion portion 141 engaged with the second coupler 150.

With reference to drawings illustrating only first coupler 140 and second coupler 150, as illustrated in FIGS. 7A and 7B, the first coupler 140 may be inserted into the inside of the second coupler 150 and then engaged with the second coupler 150. When the second coupler 150 is rotated by the drive motor unit 130 after the first coupler 140 is engaged with the second coupler 150, the first coupler 140 may be also rotated by interlocking with the second coupler 150.

Because the first coupler 140 is integrally formed at one end of the transfer member 110, the rotational force transmitted from the second coupler 150 may be transmitted to the transfer member 110. Particularly, a connection portion 111 connected to the first coupler 140 may be disposed on one side of the transfer member 110. The connection portion 111 may be formed integrally with the first coupler 140.

Accordingly, when the first coupler 140 is rotated, the transfer member 110 may be rotated together with the first coupler 140 and particularly the transfer member 110 may be rotated with respect to the rotation axis (X) of the couplers 140 and 150 to transfer the ice in the ice bucket 100.

The second coupler 150 may include a seating portion 151 on which the insertion portion 141 is seated and engaged with the first coupler 140, and a second inclined portion 152 extending in a direction opposite to a direction, into which the first coupler 140 is inserted, and inclined outwardly with respect to an inner circumferential surface of the seating portion 151. The second inclined portion 152 may guide the first coupler 140 so that the first coupler 140 is inserted into the seating portion 151.

The seating portion 151 may include a space formed in a cylindrical shape and disposed inside of the second coupler 150, and on one end of a side, in which the seating portion 151 is opened, the second inclined portion 152 may obliquely extend outward in the radial direction with respect to the rotation axis of the second coupler 150.

The second coupler 150 may include a second engaging portion 153 extending from the inner circumferential surface of the seating portion 151 to the inner circumferential surface of the second inclined portion 152. The second engaging portion 153 may be a portion engaged with the first engaging portion 143, and include a plurality of peaks 153a protruding toward the rotation axis of the second coupler 150, and a plurality of valleys 153b. Particularly, the second engaging portion 153 may extend to the second inclined portion 152 as well as the seating portion 151 engaged with the first coupler 140.

When the user moves the ice bucket 100 to the ice making compartment 50 in order to mount the ice bucket 100 to the ice making compartment 50, the first coupler 140 may approach the second coupler 150 side, as illustrated in FIG. 7A, and when the ice bucket 100 is mounted to the inside of the second coupler 150, the first coupler 140 may be inserted into the second coupler 150 and coupled to the second coupler 150, as illustrated in FIG. 7B.

When the insertion portion 141 is inserted into the seating portion 151, the plurality of peaks 143a of the first coupler 140 and the plurality of valleys 153b of the second coupler 150, and the plurality of valleys 143b of the first coupler 140 and the plurality of peaks 153a of the second coupler 150 may be overlapped in the circumferential direction with respect to the rotation axis X of each of the couplers 140 and 150, as illustrated in FIG. 7B.

However, when a user mounts the ice bucket 100 to the ice making compartment 50, it may be not easy for the user to move the ice bucket 100 so that the plurality of valleys 143b of the first coupler 140 and the plurality of peaks 153a of the second coupler 150 are overlapped in the circumferential direction with respect to the rotation axis X of the couplers 140 and 150.

For example, as illustrated in FIG. 8, the first coupler 140 may be inserted into the second coupler 150 in a direction in which the plurality of peaks 143a of the first coupler 140 and the plurality of peaks 153a of the second coupler 150 are disposed overlapped in an extension direction of each the rotation axis X.

At this time, because the plurality of peaks 143a of the first coupler 140 and the plurality of peaks 153a of the second coupler 150 are arranged overlapped in the direction of the respective rotation axis X, the insertion portion 141 may not be inserted into the seating portion 151 due to interference with each other in the insertion direction of the first coupler 140.

However, according to an embodiment, the first coupler 140 is rotatably disposed with respect to the rotation axis X, and thus when the first coupler 140 is slightly rotated in one direction or the other direction although the plurality of peaks 143a of the first coupler 140 and the plurality of peaks 153a of the second coupler 150 interfere with each other, the plurality of peaks 143a of the first coupler 140 and the plurality of valleys 153b of the second coupler 150 or the plurality of valleys 143b of the first coupler 140 and the plurality of peaks 153a of the second coupler 150 may be overlapped in the circumferential direction with respect to the rotation axis X of each of the couplers 140 and 150.

In other words, the first coupler 140 and the second coupler 150 are coupled to each other through the engagement, and thus although the interference occurs among some components, the interference may be resolved when the first coupler 140 is slightly rotated. Therefore, the first coupler 140 may be inserted into the second coupler 150 and easily coupled to the second coupler 150.

In addition, the first engaging portion 143 and the second engaging portion 153 are provided to extend to the first inclined portion 142 and the second inclined portion 152, respectively and thus when the plurality of peaks 143a of the first coupler 140 and the plurality of peaks 153a of the second coupler 150 interfere with each other, the first coupler 140 may be easily rotated through each inclined surface on the first inclined portion 142 and the second inclined portion 152 and then inserted into the inside of the second coupler 150.

Therefore, even when interference occurs during the first coupler 140 is inserted into the second coupler 150, the first coupler 140 may be rotated and then the interference may be resolved without requiring the coupler to be manually rotated by a user. In addition, because the user easily couples the first coupler 140 to the second coupler 150, the user may more easily mount the ice bucket 100 to the ice making compartment 50, compared with the refrigerator according to the conventional method.

As illustrated in FIG. 9A, when the first coupler 140 is inserted into the second coupler 150 in a state in which the rotation axis X1 of the first coupler 140 and the rotation axis X2 of the second coupler 150 are not arranged in parallel to each other, the first coupler 140 and the second coupler 150 may be not coupled to each other.

That is, as described above, when the insertion portion 141 is inserted into the seating portion 151 in a state in which the central axis of the insertion portion 141 is not parallel or coincident with the central axis of the second coupler 150, the entirety of the insertion portion 141 may be not inserted into the seating portion 151, and thus the first engaging portion 143 may be not engaged with the second engaging portion 153, because the insertion portion 141 is provided as an inserting part having a cylindrical shape and the seating portion 151 is provided as a space having the cylindrical shape.

As mentioned above, in order that the first coupler 140 is easily inserted into the second coupler 150 although the rotation axis X1 of the first coupler 140 and the rotation axis X2 of the second coupler 150 are not arranged on the same line, the first coupler 140 may include the first inclined portion 142 and the second coupler 150 may include the second inclined portion 152.

The first inclined portion 142 may extend from one end of the insertion portion 141 to the direction in which the first coupler 140 is inserted into the second coupling 150. The first inclined portion 142 may be obliquely tapered from the outer circumferential surface of the insertion portion 141 to the direction of the rotation axis X1 of the first coupler 140. The first engaging portion 143 may extend from the outer circumferential surface of the insertion portion 141 to the outer circumferential surface of the first inclined portion 142. A portion of the first engaging portion 143 disposed on the first inclined portion 142 does not engage with the second engaging portion 153 but the portion of the first engaging portion 143 may help the insertion portion 141 to be inserted into the seating portion 151. A description thereof will be described later.

The second inclined portion 152 may extend in the direction, which is opposite to the direction in which the first coupler 140 is inserted into the second coupler 150, from the opening of the seating portion 151. The second inclined portion 152 may be inclined outwardly in the radial direction of the rotation axis X2 of the second coupler 150, from the inner circumferential surface of the seating portion 151 forming the space of the seating portion 151. The second engaging portion 153 may extend from the inner circumferential surface of the seating portion 151 to the outer circumferential surface of the second inclined portion 152.

The first inclined portion 142 and the second inclined portion 152 may guide the first coupler 140 when the first coupler 140 is inserted into the second coupler 150.

As illustrated in FIG. 9B, when the first coupler 140 is inserted obliquely into the second coupler 150, the first inclined portion 142 may be inserted into the second inclined portion 152 while the first inclined portion 142 is in contact with the second inclined portion 152. At this time, the first inclined portion 142 may be guided to the seating portion 151 side along the second inclined portion 152. When the first coupler 140 is inserted obliquely as the first inclined portion 142 is moved toward the seating portion 151 along the inclination of the second inclined portion 152, an insertion inclination of the first coupler 140 may be adjusted so that the rotation axis X1 of the first coupler 140 and the rotation axis X2 of the second coupler 150 are disposed on the same line, and thus the insertion portion 141 may be inserted into the seating portion 151.

That is, when the first coupler 140 obliquely approaches the second coupler 150 side, the first coupler 140 may be in contact with one side 152a of the second inclined portion 152 without being directly inserted into the seating portion 151 side. In this time, the angle of the first coupler 140 may be adjusted so that the first coupler 140 is guided by the one side 152a of the second inclined portion 152 and then moved to other side 152b of the second inclined portion 152.

When the first coupler 140 is guided to one side 152a of the second inclined portion 152 and moved to the other side 152b of the second inclined portion 152 in a state in which the first coupler 140 does not include the first inclined portion 142, one end of the first coupler 140 may interfere with the other side 152b of the second inclined portion 152 and thus the insertion portion 141 may be caught by the second inclined portion 152 without being inserted into the seating portion 151.

However, according to an embodiment, because the first inclined portion 142 of the first coupler 140 is provided in a tapered shape, the first inclined portion 142 may guide the first coupler 140 to allow the insertion portion 141 to be inserted into the seating portion 151 without interfering with the other side 152b of the second inclined portion 152, although the first coupler 140 is guided to the direction of the other side 152b by the one side 152a of the second inclined portion 152.

That is, when the first coupler 140 obliquely approaches the second coupler 150 in a state in which the rotation axis X1 of the first coupler 140 and the rotation axis X2 of the second coupler 150 are not arranged on the same line, the first inclined portion 142 and the second inclined portion 152 may guide an insertion angle of the first coupler 140 so that the rotation axis X1 of the first coupler 140 and the rotation axis X2 of the second coupler 150 are arranged on the same line while the first coupler 140 does not interfere with the second coupler 150.

As mentioned above, the first engaging portion 143 is disposed on the first inclined portion 142 and the second engaging portion 153 is disposed on the second inclined portion 152, and a part of the first engaging portion 143 disposed on the first inclined portion 142 and a part of the second engaging portion 153 disposed on the second inclined portion 152 may additionally guide the insertion portion 141 to be inserted into the seating portion 151 when the first inclined portion 142 is in contact with the second inclined portion 152 as illustrated in FIG. 9B.

More particularly, when the peak 143a of the first engaging portion 143 disposed at the first inclined portion 142 is in contact with the valley 153b of the second engaging portion 153 disposed at the second inclined portion 152, the peak 143a and the valley 153b may be in contact with each other by having the corresponding shape, and additionally guide the first inclined portion 142 to be moved to the seating portion 151 along the second inclined portion 152.

Figure 10A:
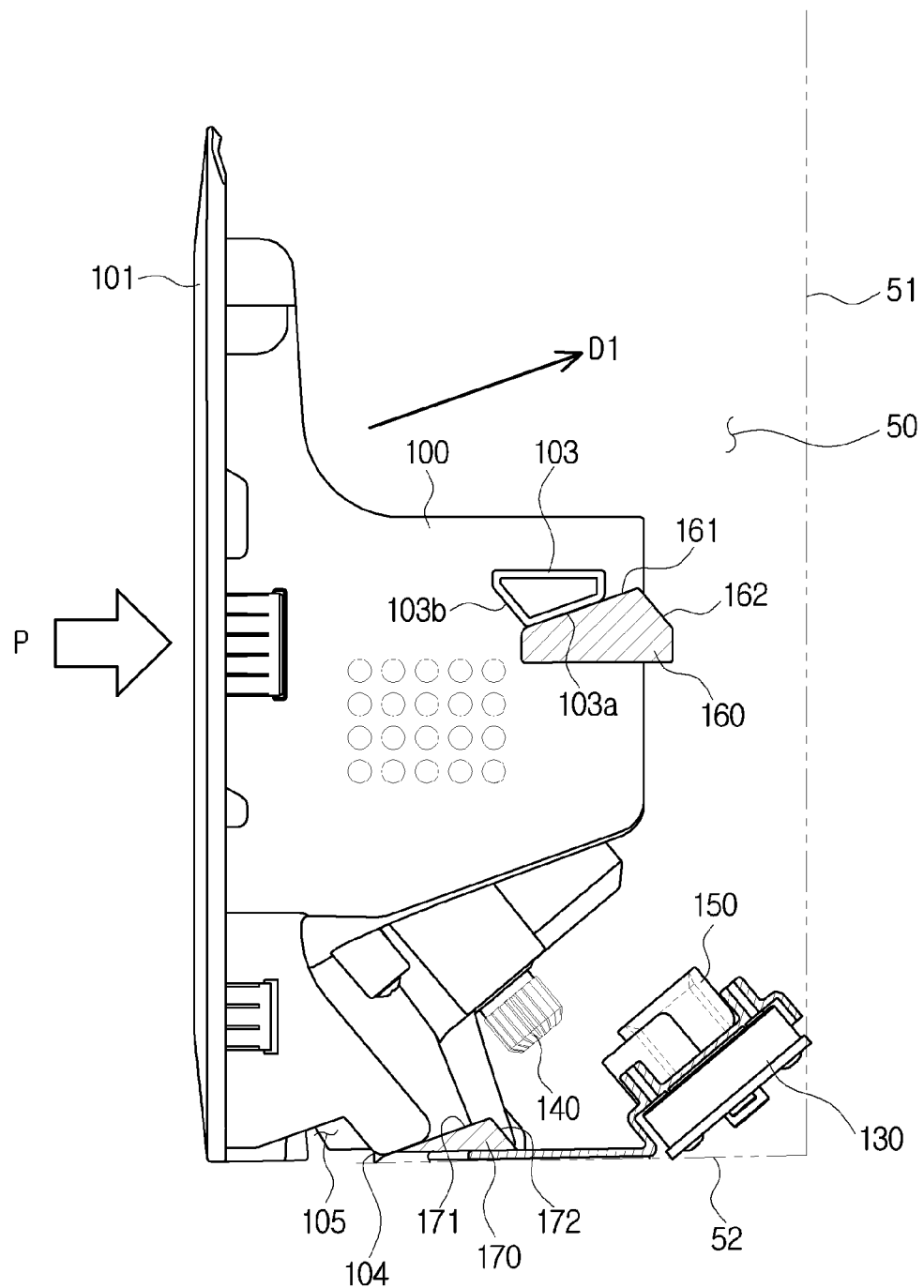
FIGS. 10A and 10B are views illustrating a state in which the ice bucket of FIG. 1 is seated in an ice making compartment.
Figure 10B:
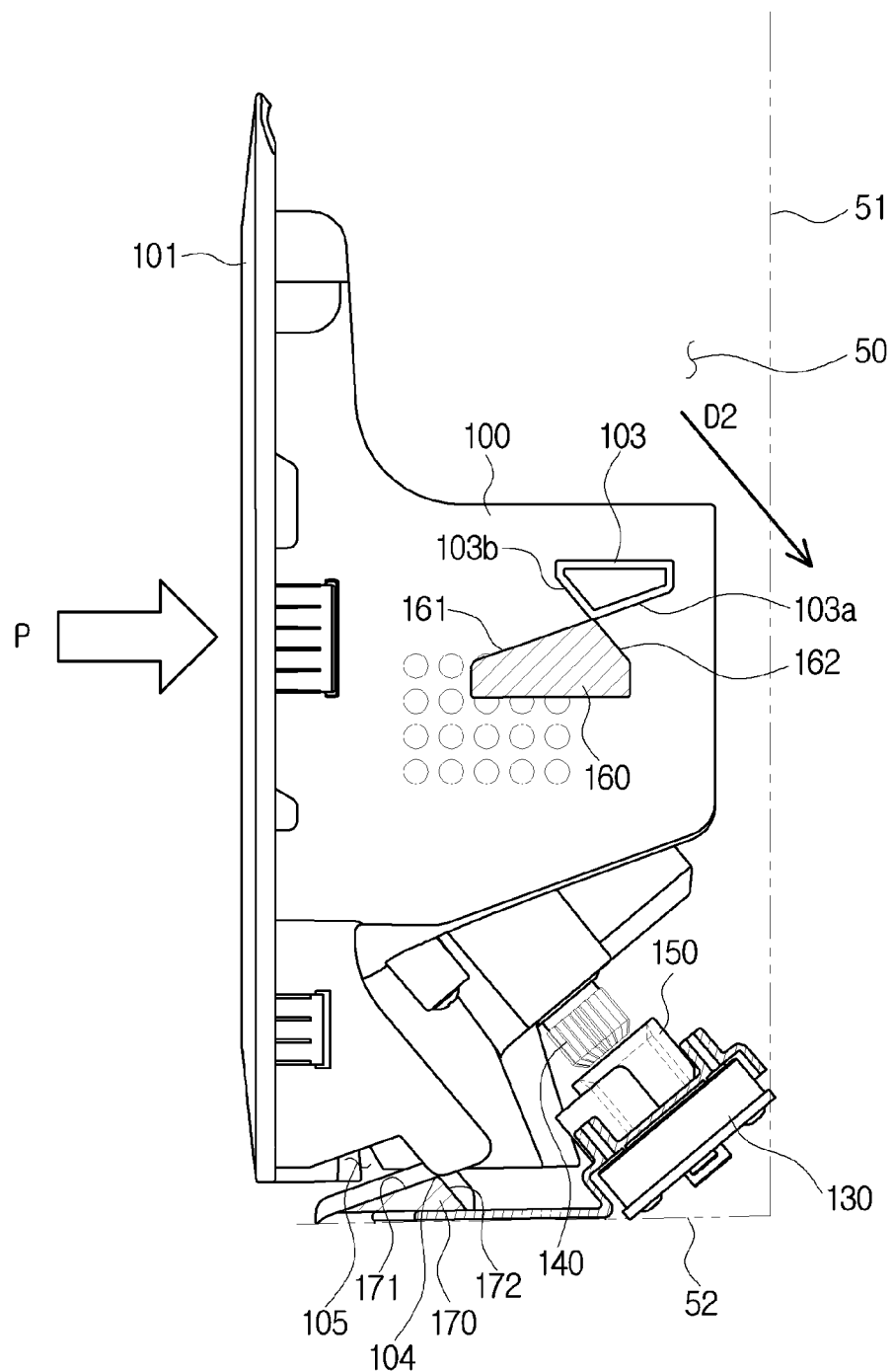

Hereinafter a guide member 160 for guiding the mounting of the ice bucket 100 and a process of guiding the ice bucket 100 when the ice bucket 100 is mounted to the ice making compartment 50 will be described. FIGS. 10A and 10B are views illustrating a state in which the ice bucket of FIG. 1 is seated in an ice making compartment.

When a user mounts the ice bucket 100 to the ice making compartment 50, it is not easy for a user to accurately couple the first coupler 140 to the second coupler 150 to mount the ice bucket 100 to the ice making compartment 50 without any help. Therefore, according to an embodiment, the refrigerator 1 may include the guide member 160 provided in the ice making compartment 50 so that the user easily mounts the ice bucket 100 to the ice making compartment 50.

The guide member 160 may be provided to protrude inwardly from both sides of the inner wall 51 of the ice making compartment 50. A guide protrusion 103 may be provided on both sides of the ice bucket 100, wherein the guide protrusion 103 is supported by the guide member 160 and provided to correspond to the guide member 160 so that the ice bucket 100 is guided into position (refer to FIG. 4).

The user places the ice bucket 100 on the guide member 160 such that the guide protrusion 103 is disposed on the guide member 160. When the user presses the ice bucket 100 toward the inner wall 51, the guide member 160 may guide the guide protrusion 103 in the direction in which the first coupler 140 is coupled to the second coupler 150 to allow the user to easily mount the ice bucket 100 to the inside of the ice making compartment 50.

That is, the user may not need to adjust the coupling angle between the first coupler 140 and the second coupler 150 for mounting the ice bucket 100 to the ice making compartment 50. When the user easily places the ice bucket 100 on the guide member 160 and presses the ice bucket 100 toward the inner wall 51, the first coupler 140 may be coupled to the second coupler 150 so that the transfer member 110 is coupled to the drive motor unit 130.

Particularly, as illustrated in FIG. 10A, the guide member 160 may include a first guide portion 161 and a second guide portion 162. The first guide portion 161 may guide the guide protrusion 103 in a first direction D1. When the user presses, in a direction P, the ice bucket 100 toward the inner wall 51, the guide protrusion 103 placed on the guide member 160 may move in the first direction D1 along the first guide portion 161.

The guide protrusion 103 may include a first guide surface 103a guided by the first guide portion 161 and a second guide surface 103b guided by the second guide portion 162. When the guide protrusion 103 is disposed on the guide member 160, the first guide surface 103a of the guide protrusion 103 may be disposed to correspond to the first guide portion 161 by the inclination of the first guide portion 161.

The first guide surface 103a may be moved in the first direction D1 along the inclined surface of the first guide portion 161 by the pressure in the direction P by the user, and thus the ice bucket 100 may be moved in the first direction D1, together with the first guide surface 103a.

The first guide portion 161 may be inclined upward toward the inner wall 51 and thus the first guide portion 161 may guide the first guide surface 103a in the upward direction toward the inner wall 51. That is, the first direction D1 is an oblique direction in which the first guide portion 161 faces the inner wall 51.

The first guide surface 103a may be moved in the first direction D1 by a predetermined distance by the first guide portion 161 and then the second guide surface 103b of the guide protrusion 103 may be guided in the second direction D2 by the second guide portion 162, as illustrated in FIG. 10B.

The second guide surface 103b of the guide protrusion 103 may extend toward the opposite direction of the inner wall 51 from one end of the first guide surface 103a facing the opposite direction of the inner wall 51. The second guide portion 162 of the guide member 160 may extend toward the direction of the inner wall 51 from one end of the first guide portion 161 facing the direction of the inner wall 51.

Therefore, when the user presses, in the direction P, the ice bucket 100 toward the inner wall 51, the first guide surface 103a may be guided along the first guide portion 161 and the second guide surface 103b may be guided along the second guide portion 162 as the ice bucket 100 is moved toward the inner wall 51.

The second guide portion 162 may be inclined downward toward the inner wall 51 to guide the second guide surface 103b toward the inner wall 51 in a downward oblique direction. That is, the second direction D2 is an oblique direction in which the second guide 162 faces the inner wall 51.

The second guide portion 162 may have an inclination angle corresponding to an inclination angle in which the first coupler 140 and the second coupler 150 extend obliquely with respect to the lower wall 52. That is, the inclination angle of the inclined surface of the second guide portion 162 with respect to the lower wall 52 may be formed to be approximately equal to a coupling angle at which the first coupler 140 and the second coupler 150 are coupled to each other.

Accordingly, the inclination angle between the lower wall 52 and the second direction D2, which is the direction in which the second guide surface 103b is guided by the second guide portion 162, may also correspond to the inclination angle in which the first coupler 140 and the second coupler 150 extend obliquely with respect to the lower wall 52, or a coupling angle at which the first coupler 140 and the second coupler 150 are coupled to each other.

Therefore, when the second guide surface 103b is guided along the inclined surface of the second guide portion 162 in the second direction D2, the first coupler 140 disposed on the rear side of the ice bucket 100 may be automatically coupled to the second coupler 150 without interference. That is, even when the user simply presses the ice bucket 100 in the direction P toward the inner wall 51, a direction in which the ice bucket 100 is moved toward the arbitrary direction may be adjusted by the first guide portion 161 of the guide member 160, and thus the ice bucket 100 may be moved to have an angle in which the first coupler 140 and the second coupler 150 are coupled to each other without interference.

In addition, the ice bucket 100 may include a support groove 105 formed in a lower end 104 of the ice bucket 100. In addition, an auxiliary guide member 170 additionally guiding the movement of the ice bucket 100 may be further provided inside the ice making compartment 50.

By guiding the lower end 104 of the ice bucket 100, the auxiliary guide member 170 may additionally guide the ice bucket 100 so that the ice bucket 100 is moved in the first direction D1 and the second direction D2. When the ice bucket 100 is finally mounted to the inside of the ice making compartment 50, the support groove 105 may be placed on the auxiliary guide member 170 to prevent the ice bucket 100 from being moved.

The auxiliary guide member 170 may include a first auxiliary guide portion 171 corresponding to the first guide portion 161 and a second auxiliary guide portion 172 corresponding to the second guide portion 162. The first auxiliary guide portion 171 may guide the lower end 104 of the ice bucket 100 in the first direction D1 in the similar manner as the first guide portion 161. The second auxiliary guide portion 172 may guide the lower end 104 of the ice bucket 100 in the second direction D2, in the similar manner as the second guide portion 162.

Therefore, when the lower end 104 of the ice bucket 100 is guided in the second direction D2 by the second auxiliary guide portion 172, the first coupler 140 may be coupled to the second coupler 150 without interference.

As is apparent from the above description, according to the proposed power transmission structure between the transfer member and the transfer motor in the ice bucket of the refrigerator, it may be possible to allow the first coupler and the second coupler to be easily connected to each other regardless of the position of the first coupler and the second coupler when the ice bucket is mounted to the drive motor.

Although a few embodiments of the present disclosure have been shown and described, it would be appreciated by those skilled in the art that changes may be made in these embodiments without departing from the principles and spirit of the disclosure, the scope of which is defined in the claims and their equivalents.

DESCRIPTION OF SYMBOLS

10: main body 21: refrigerating compartment
22: freezing compartment 26, 27, 28, 29: door
30: inner door 40: outer door
50: ice making compartment 60: dispenser
70: ice maker 100: ice bucket
110: transfer member 120: grinding blade
130: drive motor unit 140: first coupler
141: insertion portion 142: first inclined portion
143: first engaging portion 150: second coupler
151: seating portion 152: second inclined portion
153: second engaging portion 160: guide member
161: first guide portion 162: second guide portion
170: auxiliary guide member

What is claimed is:
1. A refrigerator comprising:
an ice maker configured to generate ice;
an ice bucket configured to store ice;
a transfer member configured to transfer ice stored in the ice bucket;
a drive motor configured to generate a driving force for driving the transfer member;

a first coupler connected to the transfer member, and including an insertion portion and a first inclined portion; and
a second coupler connected to the drive motor, and including
a seating portion to receive the insertion portion of the first coupler, and
a second inclined portion having a solid surface with a shape substantially corresponding to a shape of an opposing surface of the first inclined portion, and to guide, along with the first inclined portion by moving the first inclined portion into parallel alignment with the second inclined portion, the insertion portion of the first coupler to the seating portion,
wherein the second inclined portion guides the first inclined portion toward the seating portion while aligning an axis of rotation of the first coupler with an axis of rotation of the second coupler, so that when the first coupler is initially inserted into the second coupler and the axis of rotation of the first coupler is not aligned with the axis of rotation of the second coupler, the axis of rotation of the first coupler becomes aligned with the axis of rotation of the second coupler as the first coupler is further inserted into the second coupler.

2. The refrigerator of claim 1, wherein
the first inclined portion tapers from an outer circumferential surface of the insertion portion so that an outer circumference of the first inclined portion decreases in a direction in which the first coupler is inserted into the second coupler, and
the second inclined portion expands from an inner circumferential surface of the seating portion so that an inner circumference of the second inclined portion increases in a direction opposite to the direction in which the first coupler is inserted into the second coupler.

3. The refrigerator of claim 1, wherein
the first coupler is provided at a slanted angle relative to a direction of insertion of the ice bucket, and the second coupler is provided at an angle parallel to the first coupler.

4. The refrigerator of claim 1, wherein
the first coupler is integrally formed with the transfer member.

5. The refrigerator of claim 1, further comprising:
a guide member configured to guide an insertion of the ice bucket to align the first coupler with the second coupler.

6. The refrigerator of claim 5, further comprising:
a guide protrusion provided on the ice bucket and configured to contact the guide member when the ice bucket is inserted into the refrigerator.

7. The refrigerator of claim 6, wherein
the guide member comprises a first guide surface provided parallel to an axis of rotation of the second coupler, and
the guide protrusion comprises a second guide surface provided parallel to the first guide surface so the ice bucket is moved in a direction parallel to the axis of rotation of the second coupler when the ice bucket is inserted into the refrigerator to couple the first coupler to the second coupler along an aligned path.

8. The refrigerator of claim 1, wherein
the first coupler further comprises a first engaging portion provided on an outer circumferential surface of the insertion portion and an outer circumferential surface of the first inclined portion, and
the second coupler further comprises a second engaging portion provided on an inner circumferential surface of the seating portion and an inner circumferential surface of the second inclined portion.

9. The refrigerator of claim 8, wherein
the first engaging portion comprises a first peak portion protruding in an outward radial direction from an outer circumferential surface of the first coupler and a first valley portion that is recessed from the first peak portion, and
the second engaging portion comprises a second peak portion protruding in an inward radial direction from an inner circumferential surface of the second coupler and a second valley portion that is recessed from the second peak portion.

10. The refrigerator of claim 9, wherein
when the first coupler is inserted into the second coupler, the first peak portion and the second peak portion are configured to interact so that the first coupler is rotated such that the first peak portion aligns with the second valley portion.

11. The refrigerator of claim 9, wherein
when the first coupler is coupled to the second coupler, the second engaging portion is rotated by the drive motor and the first engaging portion is rotated by the second engaging portion.

12. The refrigerator of claim 1, further comprising:
a storage compartment;
an inner door configured to open and close the storage compartment; and
an ice making compartment disposed on a front surface of the inner door and separated from the storage compartment by the inner door,
wherein the ice maker and the ice bucket are provided in the ice making compartment.

13. The refrigerator of claim 12, wherein
the ice bucket is removable from the ice making compartment of the refrigerator to an outside of the refrigerator while the inner door is closed.

14. The refrigerator of claim 12, further comprising:
an outer door provided in front of the inner door to open and close the ice making compartment.

15. The refrigerator of claim 14, wherein
the ice bucket is removable from the ice making compartment of the refrigerator to an outside of the refrigerator while the outer door is opened.

16. A refrigerator comprising:
a main body including a storage compartment;
an inner door configured to open and close, and rotatably coupled to the main body to open and close the storage compartment, and having an inner surface facing toward the storage compartment when the inner door is closed and an outer surface facing away from the storage compartment when the inner door is closed;
an ice maker separated from the storage compartment by the inner door and disposed on the outer surface of the inner door;
an ice bucket provided in the ice maker and removable from the refrigerator to an outside of the refrigerator when the inner door is closed;
a transfer member configured to transfer ice stored in the ice bucket;
a drive motor configured to generate a driving force for driving the transfer member;
a first coupler connected to the transfer member; and
a second coupler connected to the drive motor and configured to be coupled to the first coupler, wherein the first coupler is configured to be inserted into the second coupler in a slanted direction relative to a direction of insertion of the ice bucket into the ice maker, and wherein the inner door closes the storage compartment by creating a seal between a rear surface of the inner door and a front surface of the main body at least at an upper portion of the inner door and a lower portion of the inner door.

17. The refrigerator of claim 16, further comprising:

an outer door provided in front of the inner door to open and close the ice maker, wherein the ice bucket is removable from the ice making compartment of the refrigerator to an outside of the refrigerator while the outer door is opened.

18. The refrigerator of claim 17, wherein the first coupler comprises an insertion portion and a first inclined portion, and the second coupler comprises a seating portion to receive the insertion portion of the first coupler, and a second inclined portion to guide, along with the first inclined portion, the insertion portion of the first coupler to the seating portion.

19. The refrigerator of claim 17, further comprising:

a guide member configured to guide an insertion of the ice bucket to align the first coupler with the second coupler, wherein the guide member comprises a guide surface provided parallel to an axis of rotation of the second coupler, and the ice bucket is moved along the guide surface when the ice bucket is inserted into the refrigerator to couple the first coupler to the second coupler along an aligned path.

* * * * *